(12) United States Patent
Clark et al.

(10) Patent No.: US 8,266,801 B2
(45) Date of Patent: Sep. 18, 2012

(54) METHOD FOR PRODUCING ABRASIVE TIPS FOR GAS TURBINE BLADES

(75) Inventors: Daniel Clark, Derbyshire (GB); Jeffrey Allen, Derby (GB)

(73) Assignee: Rolls-Royce PLC (GB)

( * ) Notice: Subject to any disclaimer, the term of this patent is extended or adjusted under 35 U.S.C. 154(b) by 1063 days.

(21) Appl. No.: 12/122,789

(22) Filed: May 19, 2008

(65) Prior Publication Data
US 2008/0304975 A1 Dec. 11, 2008

(30) Foreign Application Priority Data
Jun. 5, 2007 (GB) .................................. 0710697.4

(51) Int. Cl.
F04D 29/38 (2006.01)
F01D 5/20 (2006.01)
(52) U.S. Cl. ...................... 29/889.7; 415/173.4; 427/205
(58) Field of Classification Search ............... 415/173.4; 427/554, 560, 565, 600; 29/889.7, 889.71
See application file for complete search history.

(56) References Cited

U.S. PATENT DOCUMENTS

| 2,780,594 | A |   | 2/1957  | Dailey           |          |
|-----------|---|---|---------|------------------|----------|
| 3,637,468 | A |   | 1/1972  | Icxi et al.      |          |
| 4,522,692 | A |   | 6/1985  | Joslin           |          |
| 4,566,939 | A |   | 1/1986  | Miller et al.    |          |
| 4,802,828 | A | * | 2/1989  | Rutz et al.      | 416/241 B|
| 5,117,087 | A |   | 5/1992  | Baker et al.     |          |
| 5,262,193 | A | * | 11/1993 | Louks et al.     | 427/8    |
| 5,359,770 | A |   | 11/1994 | Brown et al.     |          |
| 5,430,666 | A |   | 7/1995  | DeAngelis et al. |          |
| 5,455,998 | A |   | 10/1995 | Miyazono et al.  |          |
| 5,571,430 | A |   | 11/1996 | Kawasaki et al.  |          |
| 5,702,574 | A | * | 12/1997 | Foster et al.    | 204/224 R|
| 5,952,110 | A |   | 9/1999  | Schell et al.    |          |
| 5,997,248 | A |   | 12/1999 | Ghasripoor et al.|          |
| 6,080,215 | A |   | 6/2000  | Stubbs et al.    |          |
| 6,645,572 | B2|   | 11/2003 | Seifert          |          |
| 6,940,037 | B1|   | 9/2005  | Kovacevic et al. |          |
| 7,077,945 | B2|   | 7/2006  | Bergsma et al.   |          |
| 7,214,904 | B2|   | 5/2007  | Zeltner          |          |
| 7,422,677 | B2|   | 9/2008  | Mazur et al.     |          |

(Continued)

FOREIGN PATENT DOCUMENTS
EP 1365107 A1 11/2003
(Continued)

OTHER PUBLICATIONS

Takaya Matsufumi et al., "Electrodeposition of chromium-silicon carbide composite coatings and their wear characteristics", Kinzoku Hyomen Gijutsu, 1987, vol. 38(3), 97-101, Japan.

Primary Examiner — Christopher Verdier
Assistant Examiner — Jason Davis
(74) Attorney, Agent, or Firm — McCormick, Paulding & Huber LLP

(57) ABSTRACT

A method of attaching particles to a substrate, comprising the steps: providing a substrate having a surface providing an interlayer on the surface which conforms to the surface of the substrate, forming a melt pool in the interlayer, depositing a material within the melt pool, allowing the material to solidify, applying a powder containing dispersed particles to the solidified material, and applying heat to attach the dispersed particles to the substrate.

14 Claims, 4 Drawing Sheets

U.S. PATENT DOCUMENTS

| | | |
|---|---|---|
| 7,651,658 B2 | 1/2010 | Aimone et al. |
| 7,744,967 B2 | 6/2010 | Gourbesville et al. |
| 7,790,014 B2 | 9/2010 | Fray et al. |
| 2004/0022957 A1* | 2/2004 | Thompson et al. ............ 427/436 |
| 2004/0096318 A1 | 5/2004 | Ohara et al. |
| 2005/0016854 A1 | 1/2005 | Chen et al. |
| 2005/0023257 A1 | 2/2005 | Pyritz et al. |
| 2005/0056628 A1 | 3/2005 | Hu |
| 2005/0247570 A1 | 11/2005 | Langeder |
| 2007/0003416 A1* | 1/2007 | Bewlay et al. ............ 416/241 B |
| 2007/0187257 A1 | 8/2007 | Noji et al. |

FOREIGN PATENT DOCUMENTS

| | | |
|---|---|---|
| EP | 1437425 | 7/2004 |
| EP | 1600248 A2 | 11/2005 |
| FR | 2688575 A1 | 9/1993 |
| GB | 1065858 A | 4/1967 |
| GB | 2034752 A | 6/1980 |
| GB | 2241506 A | 4/1991 |
| GB | 2449862 A | 12/2008 |
| JP | 04182085 A | 6/1992 |
| JP | 7040145 A | 2/1995 |
| WO | 9964636 A1 | 12/1999 |
| WO | 9964638 | 12/1999 |
| WO | 9964638 A | 12/1999 |
| WO | 2004033384 A1 | 4/2004 |
| WO | 2005038096 A1 | 4/2005 |
| WO | 2009011973 A1 | 1/2009 |

* cited by examiner

METHOD FOR PRODUCING ABRASIVE TIPS FOR GAS TURBINE BLADES

CROSS REFERENCE TO RELATED APPLICATION

This application is entitled to the benefit of British Patent Application No. GB 0710697.4 filed on Jun. 5, 2007.

FIELD OF THE INVENTION

This invention relates to coatings for substrates and in particular coatings that are used in tip clearance control for turbine blades for gas turbine engines.

BACKGROUND OF THE INVENTION

A turbine in a gas turbine engine is formed from a plurality of blade stages coupled to discs that are capable of rotating about an axis. Each stage is formed from a plurality of aerofoil blades spaced circumferentially around a respective disc. Each stage includes a set of non-rotating stators upstream of the rotors.

The turbine blades have tips that are located in close proximity to a seal in the casing that encloses the turbine. A large gap between the tip and the casing decreases the efficiency of the turbine through over-tip leakage. A narrow gap increases the risk of "tip rub" where the tip comes into contact with the seal and causes excessive wear on the components.

The tips of the blades can be coated with abrasive particles such as Cubic Boron Nitride (CBN). The particles help the blade to cut into the seal during the first use of the blade and establish an optimum tip gap. It is desirable for the particles to remain attached to the turbine tip throughout the life of the tip so that the particles can later cut the seal to compensate for blade changes caused, e.g., by creep during the life of the blade.

The particles may be secured to the tip of the aerofoil either by electroplating or by brazing. In both of these methods, the electroplate and braze material are weaker than the alloy of the blade and have a limited ability to mechanically bind the particles.

Alloys for turbines typically have minor amounts of elements such as Hafnium, which improve the high temperature oxidation resistance of the blade. Electroplating is not capable of depositing complex alloys in the tight compositional tolerances required to give desired properties.

Turbines are located downstream of a combustor and are high temperature components. The melting point depressant added to braze alloys render the alloy further unsuitable for application at a blade tip since the blade tips are subject to the highest temperatures.

High temperature creep resistant alloys used to manufacture turbine blades have characteristics that make them prone to cracking on welding. Techniques such as direct laser deposition, where a melt pool is formed in a component to which material is added to form a desired structure, have been developed. The process of welding can cause cracking at brittle grain boundary phases. Where abrasive particles are used their random geometrical alignment within the securing metal can further reduce the bond strength of the securing metal.

Such a technique is further unsuitable to secure abrasive particles as the CBN particles float on the molten pool of much more dense metal resulting in reduced adhesion. It has also been found that CBN particles can be partially decomposed under the intensity of the laser beam used to form the melt pool.

SUMMARY OF THE INVENTION

It is an object of the present invention to seek to provide an improved coating and method for tip coating a turbine blade.

According to a first aspect of the invention, there is provided a method of attaching particles to a substrate, including the steps of: providing a substrate having a surface, providing an interlayer on the surface which conforms to the surface of the substrate, forming a melt pool in the interlayer, depositing a material within the melt pool, allowing the material to solidify, applying a powder containing dispersed particles on the solidified material, and applying heat to attach the dispersed particles to the substrate.

The powder containing the dispersed particles may be sintered by the heat applied to attach the dispersed particles to the substrate.

Preferably, the step of applying heat to attach the dispersed particles to the substrate further comprises the step of creating a diffusion bond between the powder and at least one of the solidified material, interlayer and substrate.

Pressure may applied during the step of applying heat to attach the dispersed particles to the substrate.

Preferably, the interlayer is formed by electroplating. The interlayer may be a foil ultrasonically laminated to the substrate.

A high energy beam may be directed at the interlayer to form a melt pool. Preferably, the high energy beam is a laser or electron beam. The material may be deposited from a wire. The material may be deposited in powder form.

The material is a metal or alloy. Preferably, the material is a nickel alloy.

The particles may be abrasive particles. Preferably, the abrasive particles are cubic boron nitride.

The powder may be a metal or metal alloy. Preferably, the powder is a nickel alloy.

The substrate may be an aerofoil and preferably a turbine aerofoil.

DETAILED DESCRIPTION OF THE PREFERRED EMBODIMENTS

Figure 1:
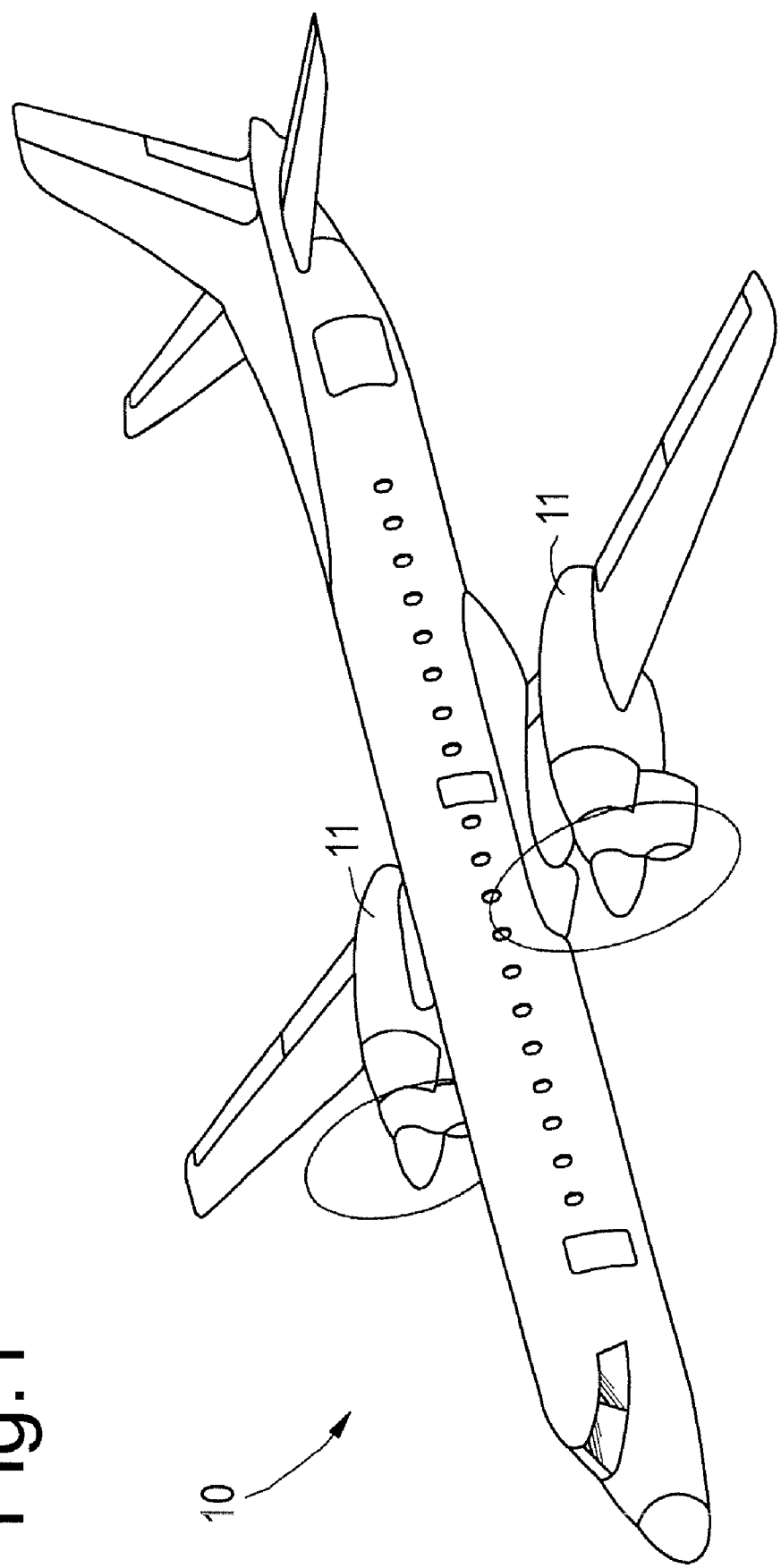
FIG. 1 is a perspective view of an aircraft having a gas turboprop engine connected thereto.
Figure 2:
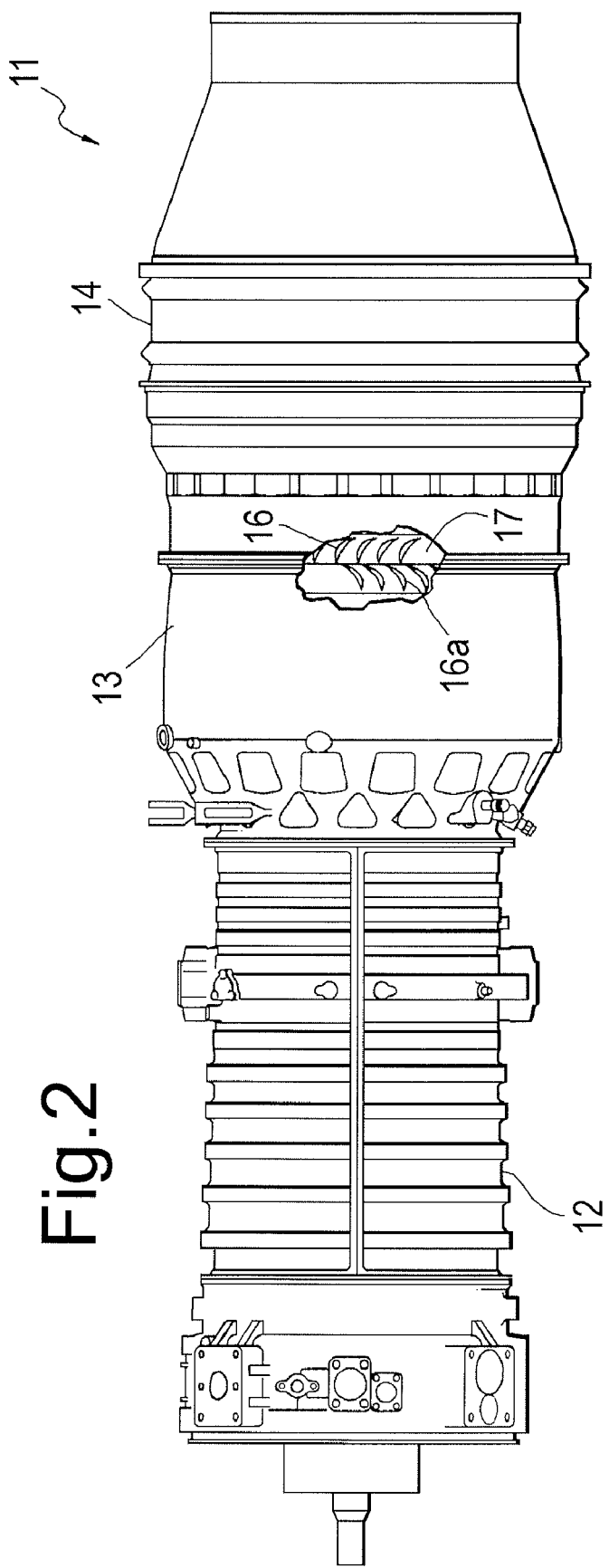
FIG. 2 is an enlarged partially fragmented side elevational view of the gas turbine engine of FIG. 1.

Referring to FIGS. 1 and 2, there is illustrated an aircraft 10 including an aircraft flight propulsion engine 11. It is understood herein that an aircraft is generic and includes helicopters, tactical fighters, trainers, missiles and other related apparatus. In the preferred embodiment, the flight propulsion engine 11 includes a compressor 12, a combustor 13 and a power turbine 14. It is important to realize that there are a multitude of ways in which the components can be linked together. Additional compressors and turbines can be added with intercoolers connected between the compressors and reheat combustion chambers could be added between the turbines. Further, the gas turbine engine is equally suited to be used for industrial applications.

With reference to FIG. 2, there is illustrated the enlarged partially fragmented view of the gas turbine engine 11. The gas turbine engine 11 having a rotor disk 17, with a plurality of turbine blades 16 mounted thereto, that is coupled to a shaft (not illustrated) within the gas turbine engine 11. A plurality of turbine vanes 16a form a nozzle within the gas turbine engine for directing the flow of working fluid relative to the blades 16. In the preferred form of the present invention, the working fluid is air extracted from the compressor 12.

Figure 3:
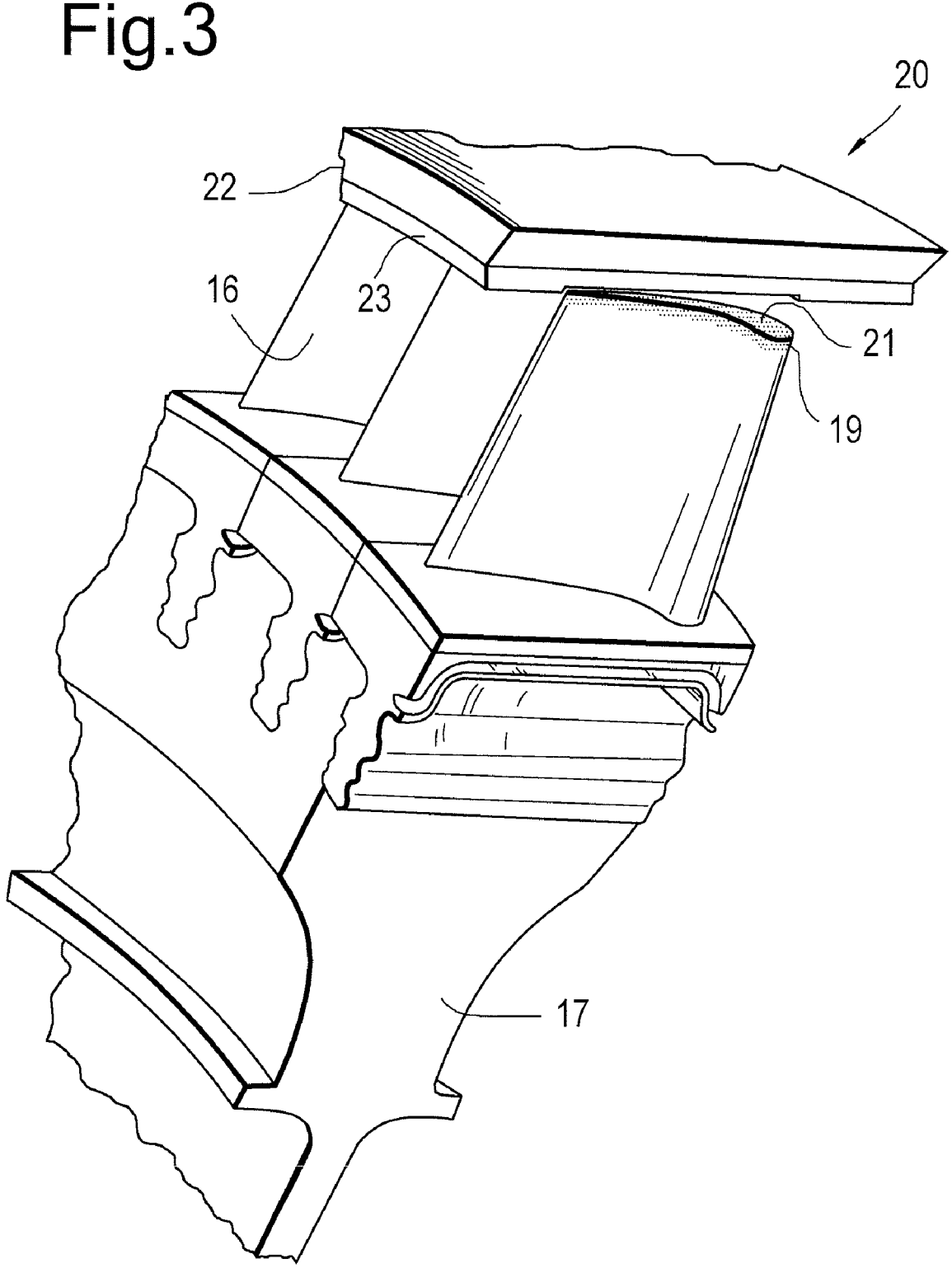
FIG. 3 is a partial perspective view of one embodiment of a seal system including a portion of the FIG. 2 gas turbine engine.

With reference to FIG. 3, there is illustrated a portion of a working fluid sealing system 20. The sealing system 20 is designed to minimize the leakage of working fluid away from and around the working fluid path. The efficiency of the gas turbine engine is dependent upon the ability to control and minimize the leakage of this working fluid. Thus, the clearance between the tip 19 of the turbine blade 16 and the static structure 22 of the gas turbine engine assists in controlling the bypassing of the rotor 17 and turbine blades 16 by the working fluid. Clearance between the rotating and static components (21 and 23 respectively) changes with the expansion and contraction of the components due to the thermal cycling occurring in the gas turbine engine.

In one form of the present invention, the sealing system 20 comprises the two corresponding components that form a virtual seal between the rotating and static components. The two components are an abrasive component 21 that is coupled to the turbine blade 16, and a stationary abradable component 23, which is coupled to the stationary component 22. The stationary abradable component 23 is often referred to as a shroud and is a member that circumscribes the rotor disk 17 and blades 16 while covering a portion of the stationary component 22.

The turbine blade 16 with abrasive component 21 rotates relative to the abradable component 23 to wear-form a seal track in the abradable component 23. The rotation of the rotor disk 17 with turbine blades 16 coupled thereto allows the abrasive components 21 to abrade the abradable component 23 when there is no clearance between the respective components. A particular aspect of the abrasive component 21 is the ability to withstand repeated and severe encounters with the abradable component 23 with only minimal loss of material from the abrasive component 21 and preferential wear of the abradable component 23. Thus, instead of a rubbing interface between the components 21 and 23 when the radial clearance therebetween has disappeared the abrasive component 21 cuts the abradable component 23 to maintain a minimum clearance therebetween. The abrasion of the abradable component 23 by the rotating abrasive component 21 forms a fluid passageway between the rotating components.

The turbine blade 16 can be of a wrought or cast structure. In the preferred embodiment, the gas turbine blade 16 is a unitary cast single crystal alloy structure produced by a precision casting operation utilizing various super alloy compositions. Various types of nickel super alloy compositions and manufacturers of such compositions are known to those skilled in the art. Most super alloy compositions of interest are complicated mixtures of either titanium, tin, vanadium, aluminum, molybdenum, silicon, neodymium and other select materials; or nickel, cobalt, chromium, aluminum, titanium, iron, tungsten, tantalum, rhenium and other select elements. A preferred group of materials are generally known by the following tradenames: CMSX-3, CMSX-4 and MARM-247, and are readily available and known to people of ordinary skill in the art. However, the application of the present invention is not intended herein to be limited to the above materials, and can be utilized with other materials. A technique for producing a cast unitary turbine blade 16 having equiaxed, directionally solidified or single crystal alloy structures is disclosed in U.S. Pat. No. 5,295,530 to O'Connor, which is incorporated by reference herein. A gas turbine blade and a gas turbine vane are often referred to as an airfoil.

A nickel or cobalt based joining layer or interlayer 18 of between 100 μm and 200 μm depth is deposited onto the turbine blade 16 through electroplating, which is a particularly preferred method as the deposited layer conforms to the substrate and has minimal microfissures. By electroplating, the layer is mechanically attached to the blade. To form the layer the aerofoil is negatively masked using a wax or other appropriate material leaving uncoated the area to which the interlayer is to be formed. The blade, or at least the tip of the blade is placed into an electroplating bath containing a solution of nickel sulphamate. An electrode is attached to the blade, which provides a cathode with an anode formed of stainless steel or carbon, which is sited within the electroplating bath. A field applied between the anode and cathode deposits a layer of nickel onto the blade. Once a layer has been formed to its desired depth of between 100 μm and 200 μm, the field is removed, the blade removed from the plating bath and the blade washed to remove traces of the plating solution and the mask material.

In an alternative method, the interlayer may be formed by ultrasonically welding a 100 μm thick foil of nickel to the blade by application of high frequency ultrasonic vibrations generated by, for example, a piezoelectric transducer.

The interlayer, deposited by either of the above methods has a strong mechanical bond with the substrate and can resist up to 6,800 psi in pull-off testing. As will be described later in this specification in the next step of the manufacturing process, the interlayer is heated with a high-energy beam, which forms a melt pool in the interlayer along with significant thermal stresses. The strong bond created between the aerofoil and the interlayer resists thermal expansion and prevents lift-off of the interlayer and creation of voids and discontinuities between the interlayer and the blade.

As will be discussed later in the application, the nickel layer and blade are treated by a diffusion method such as HiP or by heat treatment to homogenise the local composition within that region. By selecting an appropriate electroplate bath solution, the deposited electroplate layer may more closely resemble the material of the blade, which will reduce the time required to diffusion treat the tip. The bath may contain a solution of cobalt, chromium or nickel for example.

Even though more complicated alloys can be deposited ultrasonically or by electroplating, it is often not practical to deposit a composition by these methods that can resist oxidation at the high temperatures experienced by the tip of a turbine blade since capable compositions can contain upwards of 7 or 8 elemental constituents.

A layer of an oxidation resistant polycrystalline nickel alloy is deposited onto the interlayer using a technique known as direct laser deposition. A high energy beam generated by an appropriate source is directed at the interlayer. A particularly suitable high-energy beam is created from a $CO_2$ laser of the type TR1750/380 coupled to a CNC control unit. Satisfactory results are obtained with the laser operating at a laser power between 50 and 1000 W and with a scanning speed between 200 to 400 mm/min.

The high energy beam melts the interlayer and forms a melt pool with a depth that is below the height of the interlayer and therefore does not extend into the single crystal blade material. In this way, the melt pool is isolated from the material of the blade and damage to the micro-structure and grain boundary of the blade is avoided.

A nickel alloy in either powder or wire form is supplied to the melt pool. A suitable alloy is described in EP Patent No. 1207212 and has a composition that comprises about 4 to about 8 wt % Cr, about 5 to about 6.5 wt % Al, about 2 to about 6 wt % Co, about 4 to about 8 wt % Ta, about 3 to about 5 wt % Re, about 0.1 to about 0.5 wt % Hf, about 0.04 to about 0.1 wt % C, about 0.05 to about 0.3 wt % Si, and about 0.003 to about 0.01 wt % B, with at least the major part of the balance being nickel.

The laser traverses over the interlayer and as the laser traverses away from a deposition location the melt pool solidifies to leave a deposit having a height. Subsequent layers may be deposited onto earlier deposited layers to increase the cumulative height of the deposit. In this embodiment, a cumulative height of around 100 μm of the alloy is desired.

Abrasive particles, e.g. of CBN (cubic boron nitride), are applied to the layer 6 applied by direct laser deposition through a process involving thin layer powder bed additive processing.

By interlaying the layers with an additional layer formed by DLD and which has a much closer composition to that of the powder of the powder bed, a strong bond is achieved. This is believed to be primarily because the DLD formed layer is securely bonded to the electroplate layer and also provides a good keying for the powder bed process.

In the powder bed process, a jig is used to hold the DLD tipped blade in a particular orientation relative to a levelling blade. A layer of powder having, for example, an average particle size of between 10 and 50 μm is deposited onto the blade tip. The powder is of a similar composition to that of the DLD layer, i.e., it comprises about 4 to about 8 wt % Cr, about 5 to about 6.5 wt % Al, about 2 to about 6 wt % Co, about 4 to about 8 wt % Ta, about 3 to about 5 wt % Re, about 0.1 to about 0.5 wt % Hf, about 0.04 to about 0.1 wt % C, about 0.05 to about 0.3 wt % Si, and about 0.003 to about 0.01 wt % B, with at least the major part of the balance being nickel.

The levelling blade passes across the blade tip to deposit a layer, which is around 100 μm to 150 μm deep. Multiple layers may be formed to increase the depth of the deposited layer.

A layer of abrasive particles, preferably having an average size of between 100 μm and 150 μm, is sprinkled or otherwise applied to the top layer deposited by the powder bed process. The abrasive particles are preferably of a ceramic grit material, and more preferably of at least one of the following: cubic boron nitride; silicon carbide; and aluminum oxide. A mixture of at least two of the ceramic grit materials may be used. A more preferred form of the present invention utilizes a mixture of cubic boron nitride and aluminum oxide. It is understood herein that other particle sizes and ceramic grit materials are contemplated herein. The ceramic abrasive particles may be homogenous or graded through any portion of the component.

Figure 4:
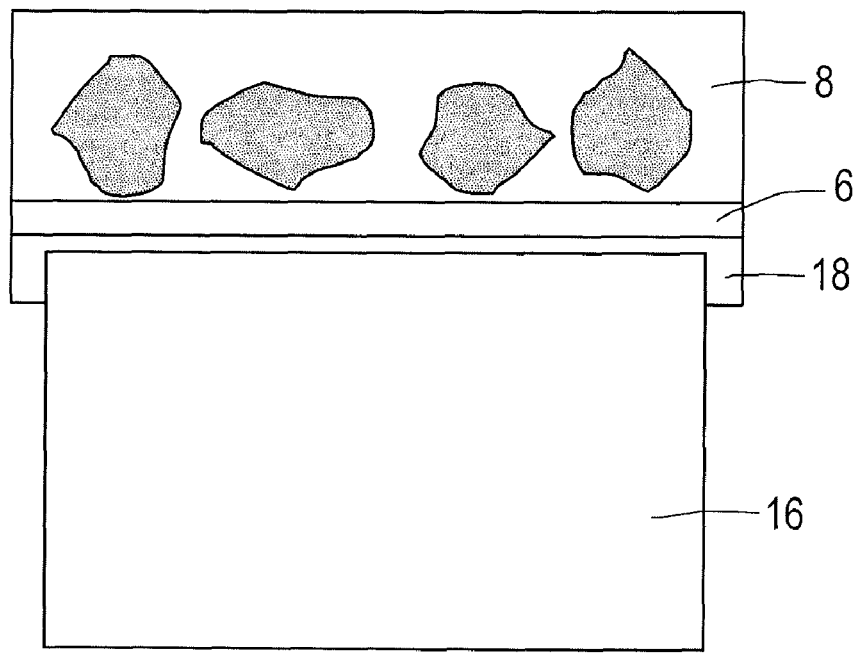
FIG. 4 depicts a turbine having a tip coating in accordance with the invention.
Figure 5:
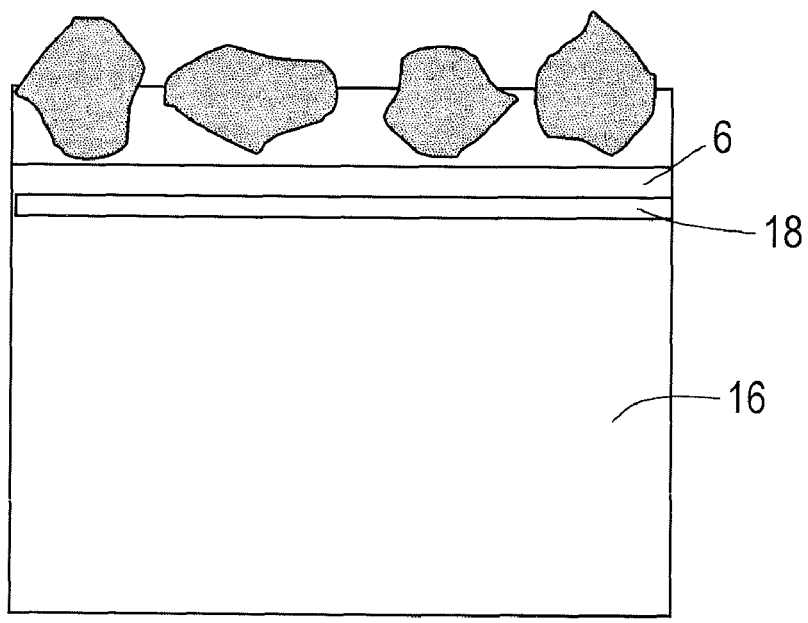
FIG. 5 depicts the turbine of FIG. 4 following machining.

The layers deposited by powder bed are around 200 μm deep in combination and enclose the CBN particles as shown in FIG. 4. The powder alloy is packed at bulk density of around 60% to 70%. Following levelling of the uppermost layer a laser is used to sinter the powder and secure the abrasive particles to the tip of the aerofoil. The laser parameters are set to minimise the dissolution of the CBN particles. The sintering of the powder causes a shrinkage of the layer to about 30-40% of its original volume. This shrinkage exposes a portion of the abrasive particles as shown in FIG. 2 which then stand proud of the layer formed by powder bed deposition whilst still being fully secured within the sintered layer. The sintered layer showing the exposed CBN particles is shown in FIG. 5.

As an alternative to a laser the powder may be sintered using a different form of heat such as an infrared lamp or the like.

The blade, electroplated layer, DLD deposited layer and the powder bed deposited layer are consolidated with high temperature post processing such as Hot Isostatic Processing (HIP). The blade is HIPed to cause diffusion bonding between layers which improves the strength and integrity between layers.

Following the HiPPing process, it may be necessary to dress the blade and to polish or machine away excess material deposited in the process described above.

What is claimed is:

1. A method of attaching particles to a substrate, comprising the steps of: providing a substrate having a surface, providing an interlayer on the surface which conforms to the surface of the substrate, forming a melt pool in the interlayer, depositing a material within the melt pool, allowing the material to solidify, providing a powder containing dispersed particles on the solidified material, and applying heat to attach the dispersed particles to the substrate, wherein the interlayer is a foil ultrasonically laminated to the substrate.

2. A method according to claim 1, wherein the powder containing the dispersed particles is sintered by the heat applied to attach the dispersed particles to the substrate.

3. A method according to claim 1, wherein the step of applying heat to attach the dispersed particles to the substrate further comprises the step of creating a diffusion bond between the powder and at least one of the solidified material, interlayer and substrate.

4. A method according to claim 1, wherein pressure is applied during the step of applying heat to attach the dispersed particles to the substrate.

5. A method according to claim 1, wherein the interlayer is formed by electroplating.

6. A method according to claim 1, wherein a high energy beam is directed at the interlayer to form a melt pool.

7. A method according to claim 6, wherein the high energy beam is a laser or electron beam.

8. A method according to claim 1, wherein the material is deposited from a wire.

9. A method according to claim 1, wherein the material is deposited in powder form.

10. A method according to claim 1, wherein the material is a metal or alloy.

11. A method according to claim 1, wherein the particles are abrasive particles.

12. A method according to claim 11, wherein the abrasive particles are cubic boron nitride.

13. A method according to claim 1, wherein the powder is a metal or metal alloy.

14. A method according to claim 1, wherein the substrate is an aerofoil and preferably a turbine aerofoil.

* * * * *